US005649362A

United States Patent [19]

Yamamoto et al.

[11] Patent Number: 5,649,362

[45] Date of Patent: Jul. 22, 1997

[54] PERMANENT MAGNET MEMBER AND METHOD OF PRODUCING SAME

[75] Inventors: Mikio Yamamoto, Fukaya; Keitaro Yamashita, Saitama-ken; Katsunobu Kiriyama, Kumagaya, all of Japan

[73] Assignees: Hitachi Metals, Ltd., Tokyo; Gunma Electronics, Ltd., Gunma-ken, both of Japan

[21] Appl. No.: 471,692

[22] Filed: Jun. 6, 1995

Related U.S. Application Data

[62] Division of Ser. No. 254,877, Jun. 6, 1994, Pat. No. 5,488, 341.

[30] Foreign Application Priority Data

Jun. 8, 1993 [JP] Japan .................................... 5-137153

[51] Int. Cl.$^6$ ........................................ B23P 15/00

[52] U.S. Cl. .................................... 29/895.21; 29/895.33; 492/8

[58] Field of Search ............................. 29/895.21, 895.3, 29/895.33; 492/8, 7; 355/251, 253; 335/709, 306, 302

[56] References Cited

U.S. PATENT DOCUMENTS

| | | | |
|---|---|---|---|
| 3,643,311 | 2/1972 | Knechtel et al. . | |
| 3,988,816 | 11/1976 | Tada | 492/8 |
| 4,992,767 | 2/1991 | Hozumi et al. . | |
| 5,384,957 | 1/1995 | Mohri et al. | 492/8 |

FOREIGN PATENT DOCUMENTS

| | | | |
|---|---|---|---|
| 53-31139 | 3/1978 | Japan . | |
| 1079212 | 4/1986 | Japan | 492/8 |
| 1228117 | 9/1989 | Japan | 492/8 |
| 2-222108 | 9/1990 | Japan . | |
| 3020420 | 1/1991 | Japan | 492/8 |
| 0038673 | 2/1991 | Japan | 29/895.33 |

*Primary Examiner*—Irene Cuda

*Attorney, Agent, or Firm*—Finnegan, Henderson, Farabow, Garrett & Dunner

[57] ABSTRACT

A permanent magnet member composed of an integral sintered body made of a ferrite magnet material, the integral sintered body including a cylindrical center portion and shaft portions formed at the opposite ends of the cylindrical center portion and each having a smaller diameter than that of the cylindrical center portion, the cylindrical center portion being provided with a plurality of magnetic poles extending axially and arranged circumferentially on an outer surface of the cylindrical center portion.

6 Claims, 3 Drawing Sheets

PERMANENT MAGNET MEMBER AND METHOD OF PRODUCING SAME

This is a division of application Ser. No. 08/254,877 filed on Jun. 6, 1994, now U.S. Pat. No. 5,488,341.

BACKGROUND OF THE INVENTION

The present invention relates to a permanent magnet member for use as a magnet roll such as a developing roll, a cleaning roll etc. in an electrophotographic apparatus, an electrostatic recording apparatus, etc., and a method of producing such a permanent magnet member.

In conventional electrophotographic apparatus, electrostatic recording apparatus, etc., a permanent magnet member used as a magnet roll such as a developing roll and a cleaning roll generally has a structure as shown in FIG. 5. The permanent magnet member comprises an integral, hollow cylindrical magnet body 1 constituted by a sintered magnet of hard ferrite, and a shaft 2 disposed at a center of the integral, hollow cylindrical magnet body 1. The integral, hollow cylindrical magnet body 1 is concentrically fixed to the shaft 2.

The integral, hollow cylindrical magnet body 1 is provided with a plurality of magnetic poles (not shown) having alternating polarities on an outer surface thereof, which magnetic poles extend axially and are arranged circumferentially at an equal or unequal interval. A pair of flanges 3 and 4 are rotatably mounted on opposite ends of the shaft 2 via bearings 5, 5. A hollow cylindrical sleeve 6 is fixedly mounted between the flanges 3 and 4 so as to surround the integral, hollow cylindrical magnet body 1. Incidentally, the flanges 3 and 4 and the sleeve 6 are made of a non-magnetic material such as aluminum alloys, stainless steel, etc. A reference numeral 7 denotes a seal member disposed between the flange 3 and the shaft 2. The integral, hollow cylindrical magnet body 1 has an outer diameter of 15–60 mm and an axial length of 200–350 mm.

In the permanent magnet member having the above structure, the integral, hollow cylindrical magnet body 1 and the sleeve 6 rotate relative to each other. For instance, the integral, hollow cylindrical magnet body 1 is kept stationary while the sleeve 6 secured to the flanges 3 and 4 are allowed to rotate relative thereto. By this construction, a magnetic developer is attracted onto a surface of the rotating sleeve 6 by a magnetic attraction force of the integral, hollow cylindrical magnet body 1 to form a magnetic brush and conveyed into a developing region for carrying out the development of latent image on an image-bearing member (not shown), or a residual magnetic developer presenting on the image-bearing member after transferring step is absorbed onto the sleeve 6 for carrying out the cleaning of the image-bearing member.

The permanent magnet member described above is for instance produced in the following manner. First, an adequate amount of polyvinyl alcohol (PVA) is added to barium-ferrite particles, mixed by using a kneader, granulated and dried to obtain a starting particulate material. Next, the starting particulate material is charged into an envelope formed of a rubber or plastic thin film and including a center core rod. The envelope charged with the starting particulate material is immersed in a liquid such as oil, glycerin, water, etc. to apply a fluid pressure therearound so that the starting particulate material is subjected to a pressure-forming (hydrostatic molding or rubber pressing) to produce the integral, hollow cylindrical magnet body 1.

The separately produced shaft designated by the reference numeral 2 in FIG. 5, is inserted into a center bore of the integral, hollow cylindrical magnet body 1, bonded thereto by an adhesive and machined to form the permanent magnet member with a plurality of magnetic poles extending axially and arranged circumferentially on an outer surface thereof.

However, such a conventional production method of the permanent magnet member requires a relatively complicated procedures for producing the integral, hollow cylindrical magnet body 1 from the starting particulate material. In addition, mounting of the shaft 2 into the bore of the integral, hollow cylindrical magnet body 1 also requires complicated procedures in which a gap generated due to a slack fit therebetween is completely filled with adhesive. To this end, it is necessary to remove an excess adhesive flown out from the gap when the shaft 2 is inserted into the integral, hollow cylindrical magnet body 1. Furthermore, the adhesive applied must be subjected to heat treatment for hardening. These procedures lead to an increase in manufacturing steps and manufacturing costs.

On the other hand, a so-called bonded magnet composed primarily of ferrite particles and thermoplastic resin material has been widely used to form the permanent magnet member. In this case, the shaft 2 is held in place within an injection mold. The ferrite particles is poured into the mold together with a heated melt of the thermoplastic resin material to form the integral, hollow cylindrical magnet body 1 around the shaft 2. After subjected to cooling and solidifying processes, the bonded magnet thus shaped is removed from the injection mold.

Incidentally, to produce the anisotropic bonded magnet having improved magnetic properties, there has been proposed a method in which a magnetic-field generating units are disposed in the injection mold. Such an anisotropic bonded magnet is advantageous because the permanent magnet member formed therefrom has a low weight and can be produced by a relatively small number of manufacturing steps. However, the molding procedure therefor requires a complicated mold. Further, when a large number of magnetic poles should be produced on the permanent magnet member, especially those having as small diameter as 20 mm or less, a corresponding large number of the magnetic-field generating units must be disposed in the mold in extremely close relation to each other. As a result, there has been problem that desired magnetization pattern of magnetic poles cannot be produced on the bonded magnet. In addition, the injection mold equipped with a large number of the magnetic-field generating units cannot substantially be manufactured, and even if possible, it would be extremely expensive.

In recent years, there have been an increased demand to produce this kind of a permanent magnet member with reduced size and enhanced magnetic properties, and at low costs. However, the conventional permanent magnets can not satisfactorily meet these requirements.

OBJECT AND SUMMARY OF THE INVENTION

Accordingly, an object of the present invention is to provide a permanent magnet member having improved magnetic properties and capable of being provided with a desired magnetization pattern at a low cost.

Another object of the present invention is to provide a method of producing such a permanent magnet member.

To achieve the above objects, in the first aspect of the present invention, there is provided a permanent magnet member comprising an integral sintered body made of a ferrite magnet material, the integral cylindrical body including a center portion and shaft portions formed at the opposite ends of the center portion and each having a smaller diameter than that of the center portion, the center portion being provided with a plurality of magnetic poles extending axially and arranged circumferentially on an outer surface of the center portion.

In the second aspect of the present invention, there is provided a method for producing a permanent magnet member composed of an integral sintered body including a center portion and shaft portions formed at opposite ends of the center portion, comprising the steps of extruding an elongated cylindrical body; cutting the elongated cylindrical body into individual cylindrical bodies having a predetermined axial length; drying each of the individual cylindrical bodies; sintering the cut cylindrical body; grinding an outer surface of the sintered cylindrical body; machining opposite ends of the sintered cylindrical body to form shaft portions having a smaller diameter than that of a center portion of the sintered cylindrical body; and providing a plurality of magnetic poles extending axially and arranged circumferentially on the outer surface of the center portion of the sintered cylindrical body.

In the above construction, the permanent magnet member according to the present invention has a freely selectable magnetization pattern thereon together with enhanced magnetic properties, and can be manufactured at low cost.

BRIEF DESCRIPTION OF THE DRAWINGS

FIG. 1(*b*) is a left side view showing the permanent magnet member shown in FIG. 1(*a*);

FIG. 2(*b*) is a left side view showing the permanent magnet member shown in FIG. 2(*a*);

DETAILED DESCRIPTION OF THE INVENTION

The present invention will be described in detail below by referring to the attached drawings.

Figure 1A:
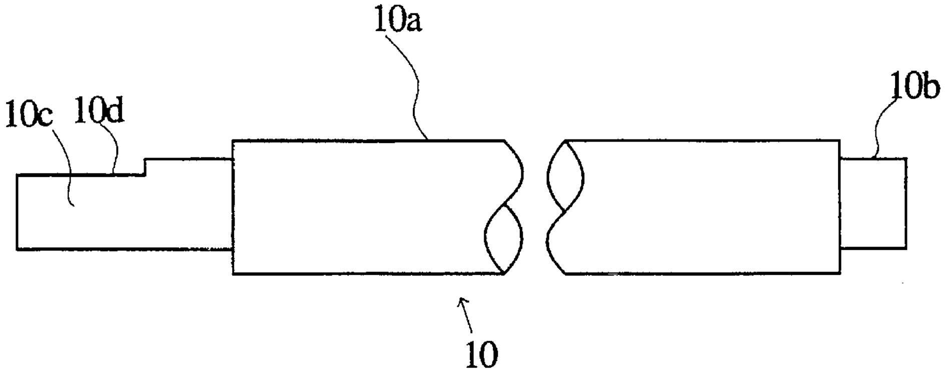
FIG. 1(*a*) is a schematic front view showing a permanent magnet member according to one embodiment of the present invention.
Figure 1B:
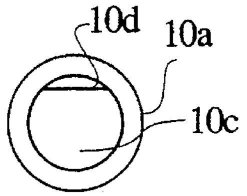

FIG. 1(*a*) and FIG. 1(*b*) show a permanent magnet member 10 according to the first embodiment of the present invention. The permanent magnet member 10 is composed of an integral solid cylindrical body which can be produced by extruding a powdery ferrite magnet material or a mixture of a ferromagnetic material and a binder and sintering the extruded body. The permanent magnet member 10 includes a center portion 10*a* having a large diameter and shaft portions 10*b* and 10*c* having a small diameter and integrally formed at opposite ends of the center portion 10*a*. The opposite shaft portions 10*b* and 10*c* serve as a support at which the permanent magnet member 10 is rotatably supported in a housing of a developing roll unit or a cleaning roll unit via bearings in the identical manner to that shown in FIG. 5. The permanent magnet member 10 is provided with a plurality of magnetic poles (not shown) having alternating polarities on an outer surface thereof, which magnetic poles extend axially and are arranged circumferentially at an equal or unequal interval.

Figure 5:
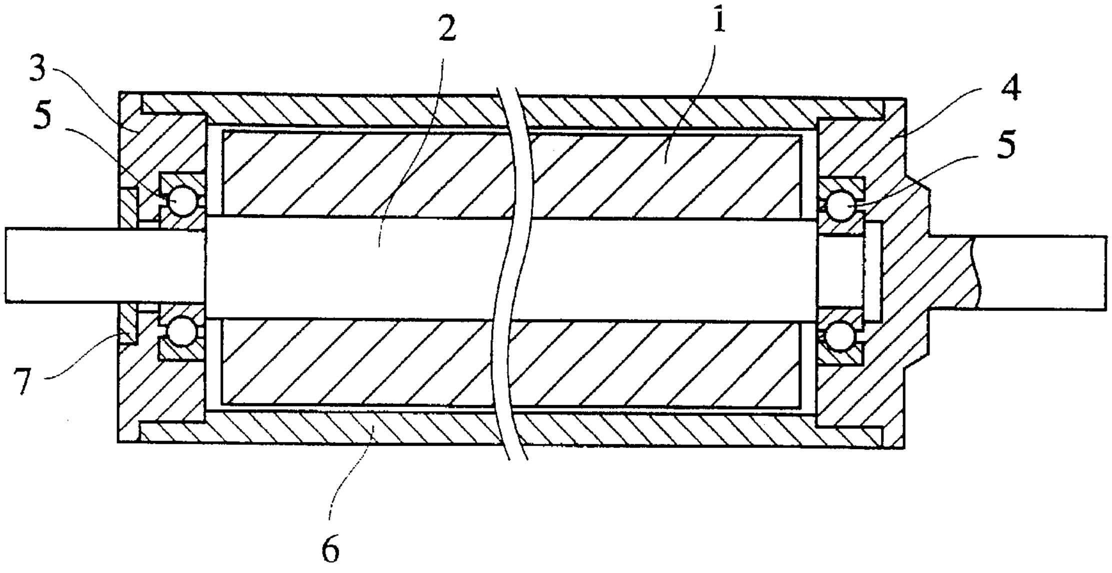
FIG.5 PRIOR ART
FIG. 5 is a schematic cross-sectional view showing a conventional permanent magnet member.

The shaft portion 10*c* is formed with a flat portion 10*d* which extends axially on an outer surface of the shaft portion 10*c* except for a journal portion opposing to the bearings 5 as shown in FIG. 5. The flat portion 10*d* may be formed by a proper machining method such as a surface grinding method. The flat portion 10*d* functions as a reference surface for positioning the permanent magnet member 10 in a magnetic field in which a magnetization of the center portion 10*a* is performed. The provision of the flat portion 10*d* ensures that the permanent magnet member 10 is held in place in the magnetic field to accurately produce respective magnetic poles at intended positions on the center portion 10*a*. The flat portion 10*d* also serves as a reference surface for positioning the permanent magnet member 10 when it is installed in the developing roll unit or the cleaning roll unit of an electrophotographic apparatus to which the permanent magnet member 10 is applied.

Figure 2A:
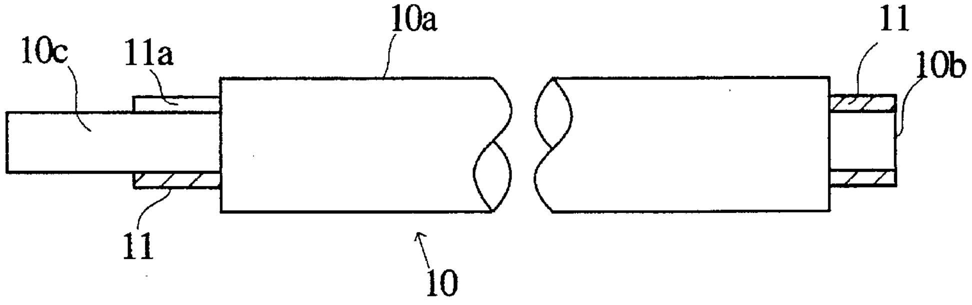
FIG. 2(*a*) is a schematic, partially cross-sectional, front view showing a permanent magnet member according to another embodiment of the present invention.
Figure 2B:
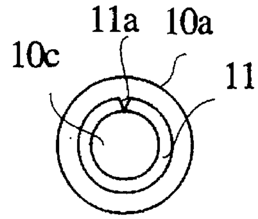

FIGS. 2(*a*) and 2(*b*) show the permanent magnet member 10 according to a second embodiment of the present invention. The permanent magnet member 10 shown in FIGS. 2(*a*) and 2(*b*) has substantially the same structure as that in FIGS. 1(*a*) and 1(*b*) except that the flat portion 10*d* is omitted and collars 11, 11 are instead pressure-fitted on the opposite shaft portions 10*b* and 10*c* at journal positions facing the bearings 5 as shown in FIG. 5. The collars 11, 11 are of a hollow cylindrical shape and made of a rigid material such as SUS304 stainless steel. One of the collars 11, 11, which is fitted on the shaft portion 10*c*, is formed with a groove 11*a* which extends axially along the permanent magnet member 10. The groove 11*a* has the same function as that of the flat portion 10*d* in the first embodiment of the present invention. Namely, the groove 11*a* serves as a reference position for magnetization and installation of the permanent magnet member 10.

A method for producing the permanent magnet member 10 according to the present invention is explained hereinafter referring to FIGS. 3 and 4.

Figure 3:
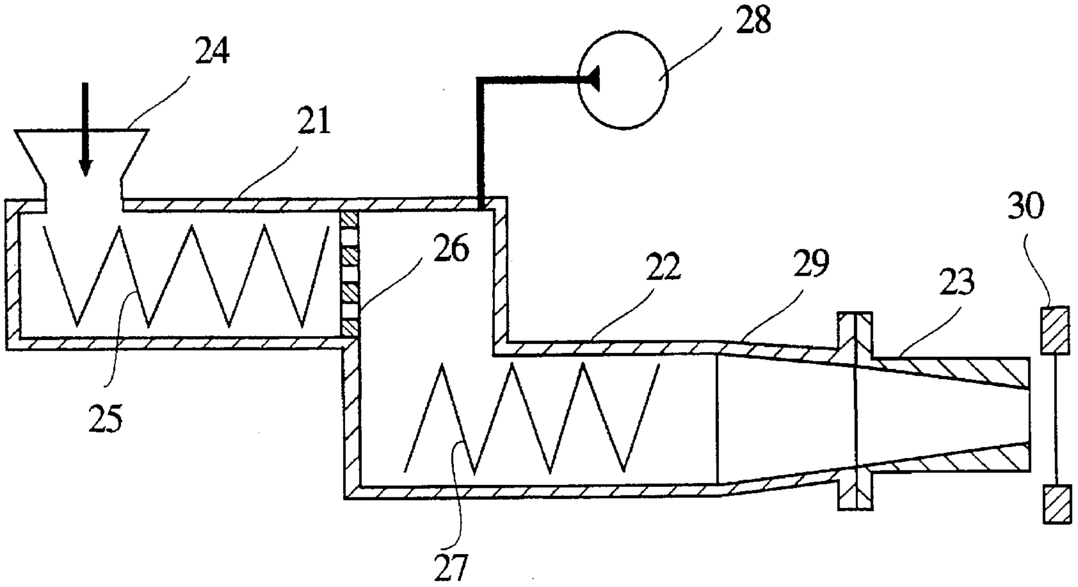
FIG. 3 is a schematic cross-sectional view showing an extruder usable for carrying out a method according to the present invention.

In FIG. 3, there are shown essential parts of an extruder used for carrying out a method of producing the permanent magnet member 10 according to the present invention. The extruder shown in FIG. 3 includes a mixing chamber 21, a vacuum chamber 22 and an extrusion die 23. The mixing chamber 21 is provided at an upper portion thereof with an inlet to which a hopper 24 is mounted. A mixing screw member 25 is disposed within the mixing chamber 21 to mix a raw material supplied from the hopper 24 and deliver it toward an outlet at which a shredder 26 is mounted. The raw material discharged from the mixing chamber 21 is fed to the vacuum chamber 22. An extrusion screw member 27 is disposed within the vacuum chamber 22 to which a vacuum pump 28 is connected to evacuate an air in the vacuum chamber 22. The vacuum chamber 22 is provided on an outlet side thereof with a tapered portion 29. Connected to an outlet side of the tapered portion 29 is an extrusion die 23 through which a cylindrical body is extruded. A cutter 30 is disposed in the vicinity of the extrusion die 23. The cutter 30 serves to cut an extruded cylindrical body into individual cylindrical bodies as mentioned in detail hereinafter.

A starting material suitable for the production of the permanent magnet member 10 comprises ferrite particles having a magnetoplumbite-type crystalline structure with a particle size of 0.7–1.5 μm and a basic composition expressed by the formula "$MO.nFe_2O_3$" wherein M represents at least one element selected from the group consisting of Ba, Sr and Pb, and n is 5–6. The ferrite particles are mixed with a liquid such as alcohol, water, etc. to prepare a muddy or pasty starting material suitable to be extruded. In this case, when an average particle size of the ferrite particles is too small, the moldability of the ferrite particles is poor. On the other hand, when the average particle size is too large, a sintered body has a low density and poor magnetic properties. Accordingly, a suitable average particle size of the ferrite particles is in a range of 0.7–1.5 μm, preferably 1.0–1.2 μm.

With respect to an amount of the liquid added to the ferrite particles, when it is too small, the moldability of the starting material becomes deteriorated, resulting in occurrence of a locally fluctuated, non-uniform density distribution and cracks on the extruded body when subjected to a sintering process. On the other hand, when the amount of a liquid added is too large, there occurs inconvenience that the extruded body has a considerably low density. Accordingly, a suitable amount of the liquid added is 10–30 weight %, preferably 15–25 weight %, based on a total amount of the ferrite particles.

The ferrite particles may be mixed with an organic binder such as methyl cellulose, carboxymethyl cellulose, etc. to improve their moldability. However, when the amount of the organic binder added is too large, the extruded body tends to suffer from cracks when subjected to a sintering process. Accordingly, a suitable amount of the organic binder added is 2 weight % or less, preferably in a range of 0.5–1.0 weight %.

Further, oxides such as $B_2O_3$, CaO and $SiO_2$ may be added in an amount of 0.1–3 weight % to the ferrite particles to enhance a density and improve magnetic properties of the sintered body.

The starting material thus prepared is supplied to the mixing chamber 21 via the hopper 24, as shown in FIG. 1. The starting material is well mixed and compressed by the mixing screw member 25 in the mixing chamber 21 and allowed to discharge through the shredder 26 disposed at the outlet of the mixing chamber 21. When the starting material passes through the shredder 26, it is subjected to pulverization. The pulverized material is then fed to the vacuum chamber 22 which is connected to the vacuum pump 28 to keep the vacuum chamber 22 under a reduced pressure. The pulverized material is degassed in the vacuum chamber 22 and delivered by the extruder screw member 27 toward the tapered portion 29. The material from the tapered portion 29 is forced to pass through the extrusion die 23 to obtain an extruded solid cylindrical body. The extruded cylindrical body is cut to individual cylindrical bodies each having a predetermined axial length to obtain a green body for production of the permanent magnet member 10.

The cylindrical green body thus obtained is dried to remove the remaining liquid components and subjected to a sintering process at a temperature ranging between 1150° C. and 1300° C., preferably 1200° C. and 1250° C., to obtain a sintered cylindrical body.

Next, the sintered cylindrical body is ground by a conventional method to obtain a smooth outer surface thereof and then machined to form shaft portions at opposite ends thereof. Since the sintered cylindrical body has a larger axial length than a diameter and exhibits a high hardness, a centerless grinding method is advantageously employed for grinding of the sintered cylindrical body, thereby preventing occurrence of defects such as poor dimensional accuracy (deviation from the predetermined dimension). For instance, the sintered cylindrical body is subjected to a through-feed grinding method to obtain the smooth outer surface and then to an infeed-grinding method to form the shaft portions.

Figure 4:
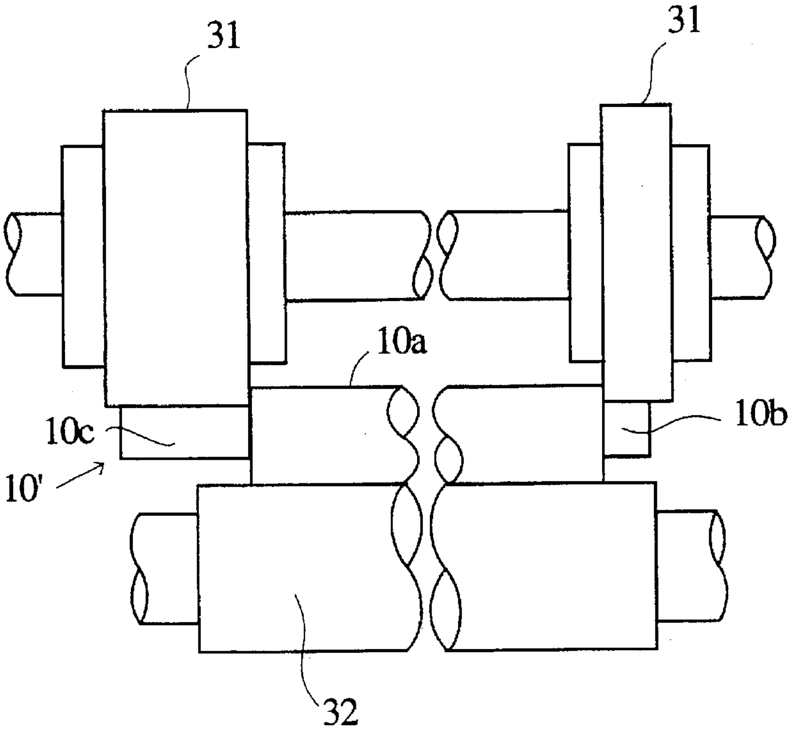
FIG. 4 is a schematic view showing a grinding apparatus usable for carrying out a method according to the present invention.

FIG. 4 shows a machining or grinding apparatus for performing the formation of the opposite shaft portions on the sintered cylindrical body. The grinding methods using the apparatus shown in FIG. 4 may be called "infeed-grinding method" In FIG. 4, reference numerals 31 and 32 denote a pair of grinding wheels and a regulating wheel, respectively, rotation axes of which are disposed vertically or horizontally in parallel with each other and permitted to rotate in the same direction. Incidentally, the regulating wheel 32 rotates at a lower speed while the grinding wheels 31, 31 at higher speed. A reference numeral 10 denotes the sintered cylindrical body to be ground which is supported at its outer surface by a backing plate (not shown) between the regulating wheel 32 and grinding wheels 31, 31 such that an axis of the sintered cylindrical body is disposed in parallel with axes of the regulating wheel 32 and grinding wheels 31, 31.

An axial length of the regulating wheel 32 is determined depending upon that of the sintered cylindrical body 10' to be ground, but the regulating wheel 32 has at least the same axial length as an entire axial length of the center portion 10*a* of the sintered cylindrical body 10'. On the other hand, axial lengths and positions of the grinding wheels 31, 31 are determined depending upon respective axial lengths and positions of the shaft portions 10*b* and 10*c* of the sintered cylindrical body 10'. In this case, a grindstone of the grinding wheels 31, 31 is preferably composed of diamond particles as a abrasive grain and a binder.

In the machining or grinding apparatus thus constructed, the sintered cylindrical body 10' to be ground is supported on the backing plate (not shown) such that the axial movement of the body is prevented. When the regulating wheel 32 begins to rotate at a low speed, the sintered cylindrical body 10' is allowed to rotate at the same circumferential speed as that of the regulating wheel 32. Next, with the grinding wheels 31, 31 being rotated, the axis of the regulating wheel 32 is moved in parallel toward the grinding wheels 31, 31 so that the opposite end portions of the sintered cylindrical body 10' is ground by the grinding wheels 31, 31 to form the shaft portions 10*b* and 10*c*. Alternatively, the sintered cylindrical body 10' may be moved toward the regulating wheel 32 and the grinding wheels 31, 31 while a distance between the regulating wheel 32 and the grinding wheels 31, 31 is kept constant.

The sintered cylindrical body made of the above-mentioned starting material (for example, YBM-3 manufactured by Hitachi Metals, Ltd.) and formed into the above-mentioned structure is then placed in a magnetic field to produce magnetic poles on the outer surface of the center portion 10*a* of the permanent magnet member 10. In this magnetizing process, the flat portion 10*d* or the axial groove 11*a* is used as a reference position for magnetization as mentioned hereinbefore.

For example, the permanent magnet member 10 may have an outer diameter of 10 mm at the center portion 10*a* and 8 mm at the shaft portions 10*b* and 10*c*. When such a permanent magnet member 10 is magnetized so as to produce twelve magnetic poles on the outer surface thereof, a surface magnetic flux density of 1200 G can be obtained.

Further, although the permanent magnet member 10 described in the above embodiments is in the form of a solid cylindrical body, it may be formed with an axial bore having as small inner diameter as 1–2 mm. In this case, such a axial bore may be formed when the cylindrical body is extruded through an extrusion die in which a center core having the same outer diameter as the inner diameter of the axial bore is placed. Such an axial bore serves as a vent during a sintering process for production of the permanent magnet member 10, thereby accelerating sintering of an inside portion thereof. Accordingly, the formation of the axial bore is advantageous especially in the production of the permanent magnet member 10 having a large diameter.

As described in detail above, the permanent magnet member and the method for producing the permanent magnet member, according to the present invention, shows the following advantages:

(1) Since the permanent magnet member is formed of an integral sintered body, it is not necessary to produce shaft portions separately, thereby to omitting a complicated bonding process and reducing manufacturing costs.

(2) Since the permanent magnet member is obtained in the form of a substantially solid body, the permanent magnet member exhibits improved magnetic properties.

(3) Even in a case where it is necessary to provide such a large number of magnetic poles that cannot be achieved by an injection molding method, the magnetization of the permanent magnet member is easily performed with a desired arrangement of magnetic poles.

What is claimed is:

1. A method for producing a permanent magnet member composed of an integral sintered body including a cylindrical center portion and shaft portions formed at opposite ends of the cylindrical center portion, comprising the steps of:

(a) extruding an elongated cylindrical body;

(b) cutting said elongated cylindrical body into individual cylindrical bodies each having a predetermined axial length;

(c) after drying, subjecting said cut cylindrical body to a sintering process to produce an sintered cylindrical body;

(d) grinding an outer surface of said sintered cylindrical body;

(e) machining opposite ends of said sintered cylindrical body to form the shaft portions having smaller diameters than that of said center portion; and (f) providing a plurality of magnetic poles extending axially and arranged circumferentially on the outer surface of said cylindrical center portion of said sintered cylindrical body.

2. The method according to claim 1, further comprising a step of forming a positioning means on at least one of said shaft portions.

3. The method according to claim 2, wherein said positioning means is in the form of a portion having an axially extending flat surface.

4. The method according to claim 1, further comprising a step of fitting a sleeve on at least one of said shaft portions.

5. The method according to claim 4, wherein said sleeve is formed with a positioning means.

6. The method according to claim 5, wherein said positioning means is in the form of an axially extending groove.

* * * * *